C. G. HALVORSON.
AUTOMOBILE PULL-OUT MECHANISM.
APPLICATION FILED OCT. 12, 1920.
1,380,205.
Patented May 31, 1921.
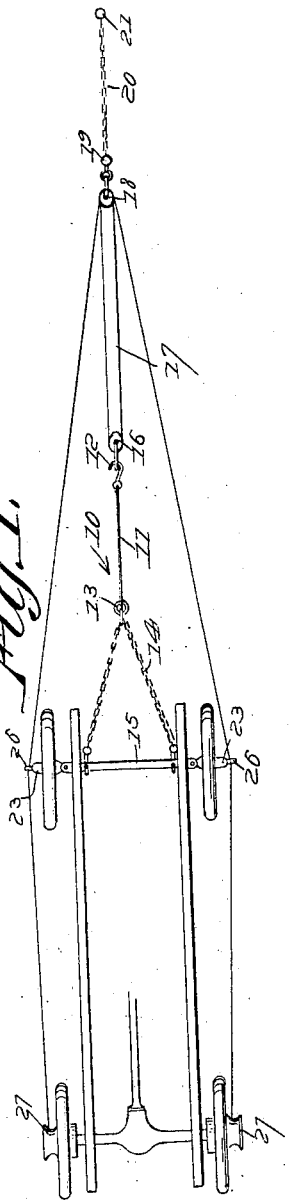
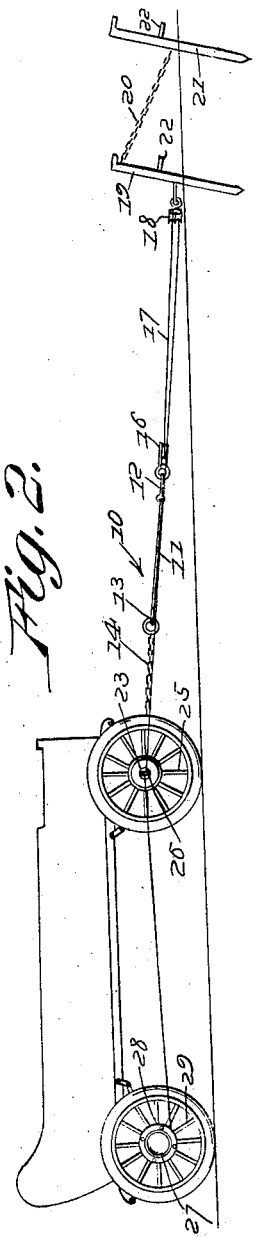
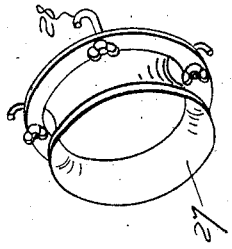
Inventor
Charles G. Halvorson,
By G. Hume Talbert
Attorney

UNITED STATES PATENT OFFICE.

CHARLES G. HALVORSON, OF BRANDT, SOUTH DAKOTA.

AUTOMOBILE-PULL-OUT MECHANISM.

1,380,205.  Specification of Letters Patent.  Patented May 31, 1921.

Application filed October 12, 1920. Serial No. 416,454.

*To all whom it may concern:*

Be it known that I, CHARLES G. HALVORSON, a citizen of the United States of America, residing at Brandt, in the county of Deuel and State of South Dakota, have invented new and useful Improvements in Automobile-Pull-Out Mechanism, of which the following is a specification.

The object of the invention is to provide a simple and comparatively inexpensive means whereby an automobile or similar motor driven vehicle may readily be extracted and moved to solid ground or a properly surfaced portion of a road when stalled in a sandy or muddy stretch or portion of the same, by utilizing the power unit of the vehicle and hence without the necessity of resorting to outside agencies; and with this object in view the invention consists in the construction and combination of parts of which a preferred embodiment is shown in the drawing, wherein:

Figure 1 is a plan view of an apparatus embodying the invention.

Fig. 2 is a side view of the same.

Figs. 3 and 4 are detail views respectively of the front and rear wheel attachments whereby the pulling cable is respectively guided and reeled to effect the movement of the vehicle.

In the illustrated embodiment of the invention a pulling rig 10 is provided for connection with the front axle of the vehicle, the same consisting for example of a draft chain 11 provided with terminal means such as a hook 12 and a ring 13 from the latter of which extend rearwardly divergent branched chains 14 which are terminally attached to a vehicle axle indicated at 15, a pulley block 16 forming a part of a block and fall being connected with the forward hook 12 of the draft chain for traverse by a cable 17. Said cable also passes through a double pulley block 18 adapted to be connected with an anchor post 19 or other fixed object which may be braced as shown at 20 by a cable or chain extending to a supplemental post 21. The anchor and bracing posts 19 and 21 may consist of stakes, as shown, provided with foot rests 22 to facilitate the forcing of the lower ends thereof into the ground to adapt and to serve their purpose of anchoring the double pulley block 18.

Connected with the front wheel of the vehicle are guiding attachments each consisting of a yoke 23 arranged to straddle or span the hub of the wheel and carrying hook bolts 24 for engagement with opposite spokes of the wheel indicated at 25 to the end that the guide may readily be clamped to the wheel, and swiveled upon the yoke is a clip 26 through which the pull-rope or cable 17 extends and moves when actuated by a drum 27 secured to the rear or driving wheel of the vehicle on the same side of the latter, it being understood that the drum may be duplicated and used at both sides of the vehicle to the end that the free ends of a single pull-rope may be attached thereto, the intermediate portion of said ropes extending through the pulley block 18 and around the pulley 16.

The drum 17 is disposed in co-axial relation with the rear or driving wheel of the vehicle and carries a plurality of hook bolts 28 for engagement with the spokes of the wheel indicated at 29 to the end that the attachment may readily be applied to and removed from the wheel so that the apparatus when not required may be stored in and carried by the vehicle.

The extension of the pull-rope through the swiveled clips or guides 26 serves to hold the intermediate portions of the cable out of contact with the ground, and obviously the operation of the driving wheels in the ordinary way, by means of the motor, will serve to reel the rope and thus apply a forward strain upon the draft attachment which will effectually remove the vehicle from its position on a portion of the road in which the traction wheels will not operate and function in the ordinary way.

Having described the invention, what I claim as new and useful is:—

1. A pull-out mechanism for automobiles having a block and fall including a cable and guiding pulleys, means for connecting one of said pulleys to the front axle of a vehicle, means carried by the vehicle for reeling the free end of the cable, and an anchoring device for connection with the other pulley of the block and fall, and consisting of an anchor stake and a supplemental bracing stake connected with the anchor stake, said stakes being provided with foot rests to facilitate the embedding of the lower extremities thereof in the road bed.

2. A pull-out mechanism for automobiles having a draft attachment and a block and fall in connection with the draft attachment and adapted for connection with an anchoring device, and reeling and guiding attachments respectively for the rear and front wheels of the vehicle, each of said attachments being provided with clamping bolts for engagement with the wheel spokes, and the guiding attachment having a hub spanning yoke and a rope guiding clip swiveled to said yoke.

In testimony whereof I affix my signature.

CHARLES G. HALVORSON.